May 15, 1962 H. POREPP Re. 25,170

TERMINAL FOR WIRE-COIL SLIDE FASTENERS

Original Filed Feb. 19, 1957

INVENTOR:
HANS POREPP
by
Richardson, David and Norton
Atty's.

United States Patent Office

Re. 25,170
Reissued May 15, 1962

25,170

TERMINAL FOR WIRE-COIL SLIDE FASTENERS

Hans Porepp, Essen, Germany, assignor, by mesne assignments, to Opti-Werk G.m.b.H. Co., Essen, Germany, a corporation of Germany Original No. 2,945,276, dated July 19, 1960, Ser. No. 641,155, Feb. 19, 1957. Application for reissue Oct. 6, 1961, Ser. No. 144,013
7 Claims. (Cl. 24—205.11)

Figure 7:
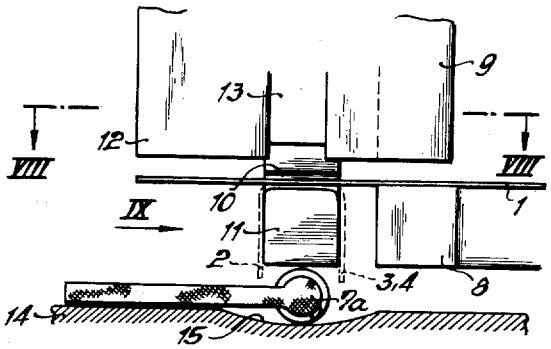
Figure 9:
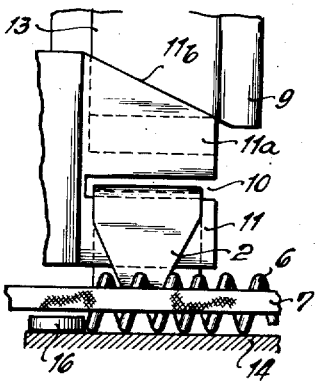
Figure 8:
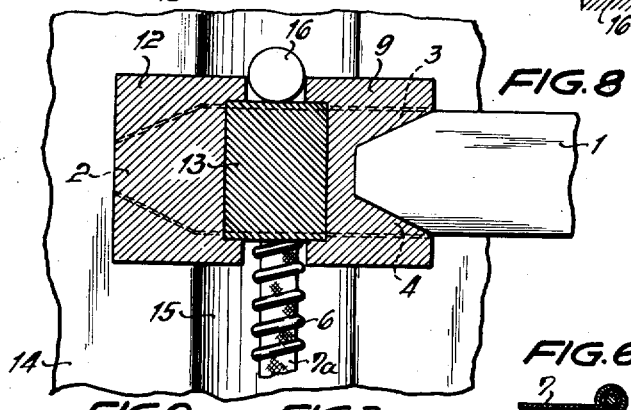
Figure 6:
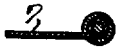

Matter enclosed in heavy brackets [ ] appears in the original patent but forms no part of this reissue specification; matter printed in italics indicates the additions made by reissue.

[Starting pieces of sliding clasp] *Terminals for slide* fasteners consist generally of a U-shaped piece of sheet metal which is mounted in front of the first fastening elements on the bead of the [fastening band] *fastener tape* and is simply pressed against the bead by [means of] its sides.

It is not possible to employ such [starting pieces] *terminals* and to mount them in [such] this manner in the case of [spiral] wire-*coil* fasteners having a [spiral] *helical* wire made of metal or plastic material; this is because the end of the [spiral] wire is free and therefore it is not possible to press [such] a [starting piece] *terminal of this type* simply round the edge of the [band] *tape* before the last winding.

[According to the invention] *In a wire-coil fastener* it is on the contrary necessary [with spiral wire fasteners] to proceed in such a manner that the last [windings] *turns* of each coil are [also] grasped by a [starting piece] *terminal member* and are permanently connected *by it* with the [band] *tape* in order to prevent from the start a gradual loosening of the [spiral] *coil* wire. In this connection it is not sufficient to employ a [usual starting] *terminal* piece of the previously mentioned type since in that case the attachment of the last [spiral wire windings on] *turns of the coil* to the [band] *tape* is insufficient.

In order to meet these requirements, the invention provides a [starting piece of spiral wire fasteners which is characterised in that its flat form has parallel slide edges, one end being in the shape of a truncated cone and at the other end comprising two tips formed by cutting away a segment corresponding in shape to the truncated cone, said segment being transposed parallel to the truncated part in the longitudinal direction, and characterised in that the truncated cone and the two tips are bent vertically or approximately vertically in relation to the median part of the piece in order to be mounted on the spiral wire end of a fastener chain.]

[Such a starting piece enables on the one hand a production] *terminal member for slide fasteners of the aforestated type which consists of a flat strip curled into cylindrical shape, the strip in its uncurled form having a pair of opposite ends of which one is blunt and the other is pointed. More particularly, the blunt end may be of trapezoid configuration, with the minor base of the trapezoid transverse to the principal dimension of the strip, while the pointed end consists of two transversely spaced prongs forming between them a recess which is complementary to the trapezoid whereby a series of such strips can be successively stamped* without waste from a flat wire [and has the advantage that it can be placed round the initial windings of the spiral wire and can be rolled up, the median part grasping the windings and the tips piercing through the band or the bead edge of the band and thereby enclosing the truncated cone disposed against the other side of the band. By this means a solid attachment of the beginning of the spiral wire on to the band is attained. By rolling up the starting piece the encompassed spiral wire windings are also compressed in their diameter so that the external circumference of the starting piece corresponds to the external circumference of the spiral wire or is smaller than it. By this means gradual transition edges from the spiral wire to the starting piece are prevented and so the starting pieces are not strained]. *Each strip can be rolled directly around the outermost turns of a coil in such manner that the blunt end rests against the tape carrying the coil while the prongs of the pointed end pierce the tape from the opposite side so as to straddle this blunt end. At the same time the intermediate strip portion, forming the cylindrical body of the terminal, firmly grasps the turns of the coil surrounded by it and compresses them against the bead of the tape engaged thereby, advantageously to such an extent that the outer diameter of the terminal member is at most equal to that of the uncompressed portion of the coil to prevent any jamming of the terminal member* in the slider [by jamming].

In order to produce [and mount starting pieces] *terminal members* according to the invention [on to the end of spiral wire zip fastener chains] *and to fasten them to the ends of wire coils designed to form the halves of a slide fastener,* it is advantageous to proceed in such a manner that *blanks adapted to form the terminal members are cut* from a flat wire of the width of the [starting piece, a starting piece is each time cut off] *blanks* by means of a cutting punch having a *trapezoidal* cutting edge [corresponding to a truncated cone, and that by means of the cutting punch the] *whereby one* end of [the cut off starting piece which] *each blank* is provided with [the] two [tips, and] prongs whereas by means of a bending punch the [truncated cone] *trapezoidal* end resulting from the prior cutting of a [starting piece are] *blank* is bent *into* U-*shape* round a bending tongue [disposed symmetrically, said bending tongue] serving as a support [of] *for* the median part of the [starting piece] *terminal member,* whereupon the bending tongue is retracted to strip off the U-shaped [starting piece and the starting piece] *member which* is pressed against a clinch plate [receiving the fastener chain through] *and around the wire coil by a* lowering *of* a clinch punch, whereby the [starting piece] *terminal member* with [the tips and the cone head are] *its trapezoidal and pronged ends is* rolled round the end of the [spiral] wire *coil* and the [tips pierce through the band of] *prongs penetrate* the bead of the [band] *tape.*

[According to the invention it] *It* is, however, *also* possible to produce first the U-shaped [starting pieces] *members,* to sort them thereafter and finally to roll them round the end of the [spiral] wire *coil* with a special device.

The accompanying drawing shows [the starting piece] *a terminal member* and [the] *a* device for producing and for mounting this [starting piece] *member* according to the invention.

[Fig.] *FIG.* 1 shows a plan view of [the starting piece, in flat developed form.] *a blank for making a terminal member;*

[Fig.] *FIG.* 2 shows a front view of the [starting piece] *terminal member* bent to a U-shape [.];

[Fig.] *FIG.* 3 shows a side view of the [starting piece] *terminal member* of [Fig.] *FIG.* 2 [.];

[Fig.] *FIG.* 4 shows a rolled-up [starting piece.] *terminal member;*

[Fig.] *FIG.* 5 shows a plan view of a [spiral] wire-*coil* fastener [chain] *half* with the [starting piece] *terminal member* mounted [.] *thereon;*

[Fig.] *FIG.* 6 shows a section along the line VI—VI of [Fig.] *FIG.* 5 [.];

[Fig.] *FIG.* 7 shows a schematic side view of the device for producing and mounting [the starting pieces] *terminal members as illustrated in the preceding figures* on a [spiral wire] fastener [chain.] *half;*

[Fig.] *FIG.* 8 shows a section along the line VIII—VIII of [Fig.] *FIG.* 7 [.]; *and*

[Fig.] *FIG.* 9 shows a view of the bending tongue *of the device of FIG.* 7 with a clinch punch and a clinch plate *as* seen in the direction of the arrow IX of [Fig.] *FIG.* 7.

[The starting piece for spiral wire zip] *A blank adapted to form a terminal member for coil-type* fasteners according to the invention is cut out of a flat wire 1 having the width of the [starting piece] *blank* in such a manner that its flat face [according to Fig.] *visible in FIG.* 1 [,] has parallel side edges, a [truncated cone] *trapezoidal formation with transverse minor base* 2 at one end, and two pointed tips 3 and 4 at the other end. These tips are produced by cutting out a segment corresponding to the [truncated cone] *trapezoid* 2, [whereby] the *inwardly directed* edges of the *tips or prongs 3, 4 lying* [segment lie] parallel, in longitudinal direction, to the corresponding edges of the [truncated cone] *flanks of the trapezoid* 2. This [flat plate] *blank* is bent at its central zone 5 to form a U-shaped [starting piece] *terminal member* as shown in [Figs.] *FIGS.* 2 and 3 and is rolled round the end [windings] *turns* of the [spiral] wire *coil* 6 of a [zip] *slide*-fastener [chain] *half* in such a manner that the [end] [edges] *minor base* of the [truncated cone] *trapezoid* 2 comes to bear against one side of the [fastening band] *tape* 7, whilst the central part 5 with the tips 3 and 4 [are] *is* rolled round the [spiral wire windings] *coil 6* until the tips 3 and 4 pierce [through] the [band 7 or the] bear 7a of the [band] *tape 7* and thereby partially [enclosed the truncated cone] *straddle the trapezoid* 2 [laterally]. Such a rolled-up [starting piece] *terminal member* is shown, somewhat enlarged, in [Fig.] *FIG.* 4.

In order to produce the [starting pieces] *blanks* and [in order] to mount the [starting pieces] *terminal members* on [to] the end [windings] *turns* of a fastener [chain] *coil* it is advantageous to proceed as follows.

Figure 2:
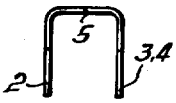
Figure 3:
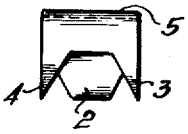
Figure 5:
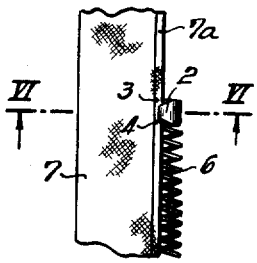
Figure 4:
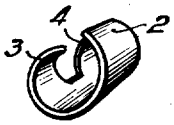
Figure 1:
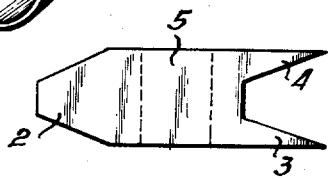

A flat metal wire having the width of the [starting pieces] *blanks* according to [Fig.] *FIG.* 1 is first led with its free end to a cutting plate 8 and the free end of the flat wire 1 is cut by means of a cutting and bending punch 9, the cutting plate 8 and the cutting punch 9 being correspondingly shaped so that the [flat wire] end *of wire* 1 now has a shape 2 of a [truncated cone] *trapezoid.* Now begins the peridoical production of the [starting pieces, and] *blanks during which* the flat wire 1 is periodically advanced [each time according] *in steps each equal* to the [partial] length of [the starting piece] *a blank.* When advancing, the flat wire passes through a slot 10 of a bending tongue 11; [and] this slot 10 [is provided in such a manner] *is so shaped* that its open [side lies in the direction of] *sides are parallel to* the [spiral wire] *coil* 6 as can be seen from [Figures] *FIGS.* 7 and 9. The free end of the flat wire with the [cone head] *trapezoid* 2 projects out of the slot 10 of the bending tongue 11 [and the] *whose* width [of the bending tongue] corresponds approximately to the width of the central part 5 of the [starting piece] *terminal member.* Above the part of the flat wire which projects beyond the bending tongue there is provided a bending punch 12 operating [parallel] *concurrently* with the cutting and bending punch 9. When the flat wire has taken the prescribed position, the cutting and bending punch 9 and at the same time also the bending punch 12 [is] *are* lowered, so that by means of the cutting punch 9 a [starting piece] *blank* of the form shown in [Fig.] *FIG.* 1 is cut from the flat wire 1, whereupon by a further lowering of the punches 9 and 12 the free ends of the [starting piece] *blank* with the [cone head] *trapezoid* 2 and the tips 3 and 4 are vertically bent downwardly round the bending tongue, the bending tongue 11 serving as a support [to] *for* the central part 5. The [starting piece] U-*shaped terminal member of FIGS. 2 and 3* is produced in this manner.

The [starting pieces] *terminal members* produced in the previously described manner can now be conveyed to a sorting device and from there to a rolling-on device by means of which [the starting piece will, in the previously mentioned matter be rolled round an initial winding] *they are secured to the end turns* of [a spiral wire] fastener [chain] *coils.*

However, it is also possible to combine the device for producing the [starting pieces] *terminal members* with a rolling-on device. For this purpose the upper part of the *support for the* bending [punch] *tongue* 11 is so constructed that a free middle part is bounded by two side walls 11a disposed paralled to the [spiral] wire *coil* 6. The [surfaces of these] side walls 11a have [a slope] *sloping upper surfaces* 11b disposed [at] *above* the open sides of the slot 10. Above [this] bending tongue *11* is disposed a clinch punch 13 operating vertically which has a plane lower face and lateral segments [,] whose upper edges comprise sloping faces which correspond to the slope 11b the bending-tongue *support* and *co*-operate [against these sloping faces 11b] *therewith.* If this clinch punch 13 is lowered after producing the U-shaped [starting piece] *terminal member,* the bending tongue 11 will be [pressed] *cammed* out of the feed zone of the flat wire by means of the sloping faces 11b and the corresponding sloping faces of the clinch punch 13, and at the same time the U-shaped [starting piece] *member 2—5* is stripped off [from] the bending tongue 11 and is maintained in its position by guides (not shown) until the horizontal lower face of the clinch punch bears against the [starting piece] *portion* 5. Beneath the bending tongue 11 there [now] lies a clinch plate 14 having a [curvature] *shallow groove* 15 which extends perpendicularly to the longitudinal direction of the flat wire 1. The [spiral wire] *coil* 6 is introduced [in] *into* this [curvature] *groove* 15, the fastener [band] *tape* 7 lying flat on the surface of the clinch plate 14. By means of this clinch plate 14 and the [fastener chain which is introduced] *inserted coil,* as the [starting piece] *terminal member* is further pressed down by [means of] a further lowering of the clinch punch 13, the [cone] *trapezoidal* end 2 comes to bear against the upper side of the [fastener band] *tape* 7 whilst the tips 3 and 4 thrust against the [curvature] *curved bottom of groove* 15 of the clinch plate 14 and then [roll up] *turn upwardly* whereby the central part 5 of the [starting piece] *terminal member* encompasses the initial [windings] *turns* of the [spiral wire] *coil* 6 and the tips pierce [through] the [band] *tape* 7 [of] *at* the [head of the band] *bead thereof.* Thereby the [starting piece] *terminal member* assumes essentially a shape as [indicated] *illustrated* in [Figs.] *FIGS.* 4 to 6. By the rolling up of the [starting piece] *terminal member* by means of the clinch punch 13 and the clinch plate 14 the initial [windings] *turns* of the [spiral] wire *coil* 6 are compressed and so their diameter is reduced, possibly to such an extent that the outer circumference of the [starting piece] *terminal member* coincides with the outer circumference of the adjacent [spiral windings] *turns* of the [spiral] wire *coil* 6 or [,] is smaller than that. [By this means] *Thus,* there are no edges projecting beyond the circumference of the [spiral windings] *wire turns* which could jam or catch in the fastener slider and could possibly lead to a loosening of the [starting pieces] *terminals.* The initial [windings] *turns* of the [spiral wire] *coil* are soildly and intimately connected with the fastener [band] *tape* 7 by means of this [starting piece,] *terminal member* so that the end [windings] *turns* can no longer become loosened.

In order to mount the [starting pieces] *terminal members* on [to] the initial [windings] *turns* of the individual fastener [chains] *coils* the processes described are repeated periodically. In order to ensure that each time the same number of [windings is] *turns are* encompassed at the beginning of the [spiral] wire *coil* by the [starting piece] *terminal member* it is advantageous to provide a stop 16 in the [curvature] groove 15 of the clinch plate 14 as is indicated in [Figs.] *FIGS.* 6 and 9. This stop is disposed with its [stop] *contact* edge approximately beneath the [ground face] *rear wall* of the slot 10 of the bending tongue 11 and its height corresponds to the [height of] *extent to which* the [spiral] wire [windings which] *turns* project beyond the thickness of the fastener [band] *tape* 7. In this manner it is possible to place the [spiral] wire [fastener chains] *coils* always in a uniform position in the [curvature] *groove* 15 of the clinch plate 14.

It is possible with [zip fastener chains with spiral wires] *slide fasteners having coils* made of a plastic material to [tye] *dye* the plastic material at will and to give it the same [colour] *color* as the fastener [band] *tape*. In order to produce [the starting pieces] *terminal members* in the same [colour] *color* it is possible to provide the outer surface of the [starting pieces] *terminal members* or the upper side of the flat wire strip [leading to the described device] *use in their manufacture* with a special lacquer having the same [colour] *color* as the fastener and withstanding the attack from the described bending and rolling tools.

What I claim as new and desire to secure by Letters Patent of the United States is:

1. In a separable slide fastener of the type having a pair of parallel tapes with their meeting edges each having a [spiral] *helical* coil carried thereby, and a slider carried by said coils to interlock and open said coils by movement in one direction or the other along the length of the tapes, means for clamping the terminal end of each coil to its respective tape, said clamping means comprising a strip having a [truncated cone] *trapezoidal* male portion at one end and a female corresponding reentrant portion at the other end, the sides of the strip at the female end forming prongs, said strip being clamped around the coil member with the said male portion engaging the surface of the tape on one side thereof, and with said female portion engaging the tape on the other side thereof, the pronged portions penetrating the tape and spanning the [cone] *trapezoidal* portion at the other end of the strip.

2. A device according to claim 1 in which the diameter of the clamping means over the [spiral] coil is no greater than the mean diameter of the exposed portion of the coil.

3. In a separable slide fastener of the type having a pair of parallel tapes with their meeting edges each having a [spiral] *helical* coil carried thereby and a slider carried by said coils to interlock and open said coils by movement in one direction or the other along the length of the tapes, means for clamping the terminal end of each coil to its respective tape comprising a strip having a [trunctated cone] *trapezoidal* male portion at one end and a female corresponding reentrant, cutout portion at the other end, the sides of the strip at said female end forming prongs, said strip being clamped around the coil member with said male portion engaging the surface of the tape on one side thereof, and with said female portion engaging the tape on the other side thereof, the pronged portions penetrating the tape and extending along the side of the [cone] *trapezoidal* portion, the male portion extending into the female portion, the strip having an external diameter no greater than the mean diameter of the exposed length of the coil, said strip forming a slider-stop member at the end of the coil to limit the movement of the slider.

*4. In a slide-fastener half, in combination with a tape and a helical coil carried by said tape along one edge thereof, a terminal member for said coil embracing the final turns of the latter and anchoring same to said tape, said terminal member comprising a strip rolled into generally cylindrical shape and having a blunt and a pointed end, said blunt end resting flat against one side of said tape, said pointed end forming prongs piercing said tape from the opposite side and straddling said blunt end.*

*5. In a slide-fastener half, in combination with a tape formed with a bead along one edge and a helical coil carried by said tape while surrounding said bead, a terminal member for said coil embracing the final turns of the latter and anchoring same to said tape, said terminal member comprising a strip rolled into generally cylindrical shape and having a blunt and a pointed end, said blunt end resting flat against one side of said tape inwardly of said bead, said pointed end forming prongs piercing said tape from the opposite side and straddling said blunt end.*

*6. In a slide-fastener half, in combination with a tape and a helical coil carried by said tape along one edge thereof, a terminal member for said coil embracing the final turns of the latter and anchoring same to said tape, said terminal member comprising a strip rolled into generally cylindrical shape and having a substantially trapezoidal male end with a transverse minor base and a complementary female end, said male end resting with said minor base flat against one side of said tape, said female end forming prongs piercing said tape from the opposite side and straddling said male end.*

*7. In a slide-fastener half, in combination with a tape formed with a bead along one edge and a helical coil carried by said tape while surrounding said bead, a terminal member for said coil embracing the final turns of the latter and anchoring same to said tape, said terminal member comprising a strip rolled into generally cylindrical shape and having a substantially trapezoidal male end with a transverse minor base and a complementary female end, said male end resting with said minor base flat against one side of said tape inwardly of said bead, said female end forming prongs piercing said tape from the opposite side and straddling said male end.*

References Cited in the file of this patent or the original patent

UNITED STATES PATENTS

| | | |
|---|---|---|
| 2,198,345 | Legat | Apr. 23, 1940 |
| 2,296,880 | Smith | Sept. 29, 1942 |
| 2,299,230 | Hanseon | Oct. 20, 1942 |
| 2,483,703 | Legat | Oct. 4, 1949 |
| 2,691,198 | Flood | Oct. 12, 1954 |
| 2,766,631 | Van Sittert | Oct. 16, 1956 |
| 2,832,119 | Neitlich | Apr. 29, 1958 |